United States Patent
Weikal (10) Patent No.: US 8,922,930 B1
(45) Date of Patent: Dec. 30, 2014

(54) LIMIT DISC NODES BY BAND USAGE

(71) Applicant: Seagate Technology LLC, Cupertino, CA (US)

(72) Inventor: Adam Weikal, Butler, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/832,184

(22) Filed: Mar. 15, 2013

Related U.S. Application Data (60) Provisional application No. 61/712,702, filed on Oct. 11, 2012.

(51) Int. Cl.
*G11B 15/04* (2006.01)
*G11B 19/04* (2006.01)
*G11B 20/12* (2006.01)

(52) U.S. Cl.
CPC ................. *G11B 20/1217* (2013.01)
USPC .......................................................... 360/60

(58) Field of Classification Search
None
See application file for complete search history.

(56) References Cited

U.S. PATENT DOCUMENTS

| | | | |
|---|---|---|---|
| 7,231,497 B2 | 6/2007 | Trika | |
| 7,440,221 B2 | 10/2008 | Tsuchinaga | |
| 7,965,465 B2 | 6/2011 | Sanvido | |
| 7,966,456 B2 | 6/2011 | Trika | |
| 7,970,989 B2 | 6/2011 | Matthews | |
| 7,982,994 B1 | 7/2011 | Erden | |
| 8,179,627 B2 | 5/2012 | Chang | |
| 8,270,256 B1 | 9/2012 | Juang | |
| 8,300,341 B2 | 10/2012 | Itakura | |
| 8,310,786 B2 | 11/2012 | Fuente | |
| 2005/0144396 A1 | 6/2005 | Eschmann | |
| 2010/0232057 A1* | 9/2010 | Sanvido et al. | 360/78.04 |
| 2011/0085266 A1 | 4/2011 | Kanai | |
| 2011/0138106 A1 | 6/2011 | Prabhakaran | |
| 2011/0292545 A1 | 12/2011 | Katada | |
| 2011/0299373 A1 | 12/2011 | Ho | |
| 2012/0060073 A1 | 3/2012 | Itakura | |
| 2012/0066435 A1* | 3/2012 | Colgrove et al. | 711/103 |
| 2012/0069466 A1 | 3/2012 | Okamoto | |
| 2012/0099216 A1 | 4/2012 | Grobis | |
| 2012/0162808 A1 | 6/2012 | Masuda | |
| 2012/0194937 A1 | 8/2012 | Tagami | |
| 2012/0212847 A1 | 8/2012 | Sato | |
| 2012/0233432 A1 | 9/2012 | Feldman | |
| 2012/0250174 A1 | 10/2012 | Sueishi | |
| 2012/0300328 A1 | 11/2012 | Coker | |
| 2012/0300333 A1 | 11/2012 | Tinker | |

(Continued)

OTHER PUBLICATIONS

Design Issues for a Shingled Write Disk System, Ahmed Amer, et al.; © 2010 IEEE.

(Continued)

*Primary Examiner* — Regina N Holder
(74) *Attorney, Agent, or Firm* — Cesari & Reed, LLP; Kirk A. Cesari; Christian W. Best (57) ABSTRACT

The present disclosure generally relates to shingled recording systems, such as shingled magnetic recording (SMR). In some embodiments, systems having a data storage device containing a write cache and shingled bands may store new data from a host in the write cache before writing it to shingled track main storage. The system may determine when to throttle completion of commands based on a number of unique bands associated with data stored in the write cache.

20 Claims, 7 Drawing Sheets

(56) References Cited

U.S. PATENT DOCUMENTS

| | | |
|---|---|---|
| 2012/0303867 A1 | 11/2012 | Hall |
| 2012/0303884 A1 | 11/2012 | Hall |
| 2012/0303889 A1 | 11/2012 | Coker |
| 2012/0303928 A1 | 11/2012 | Hall |
| 2012/0307400 A1 | 12/2012 | Kawabe |
| 2013/0027802 A1 | 1/2013 | Kim |
| 2013/0027806 A1 | 1/2013 | Cho |
| 2013/0031296 A1 | 1/2013 | Na |
| 2013/0031306 A1 | 1/2013 | Kim |
| 2013/0031317 A1 | 1/2013 | Ryu |
| 2013/0031406 A1 | 1/2013 | Cho |
| 2013/0038960 A1 | 2/2013 | Song |
| 2013/0038961 A1 | 2/2013 | Song |
| 2013/0321948 A1* | 12/2013 | Bandic et al. .................. 360/75 |

OTHER PUBLICATIONS

Emulating a Shingled Write Disk, Rekha Pitchumani, et al., International Symposium on Modeling, Analysis, and Simulation of Computer and Telecommunication Systems, at Washington, DC (Aug. 2012).

* cited by examiner

LIMIT DISC NODES BY BAND USAGE

CROSS REFERENCE TO RELATED APPLICATIONS

The present application is a non-provisional application of and claims priority to U.S. provisional patent application Ser. No. 61/712,702, filed Oct. 11, 2012, entitled "Limit Disc Nodes By Band Usage," the contents of which are hereby incorporated by reference in their entirety.

BACKGROUND

The present disclosure generally relates to shingled recording systems, such as shingled magnetic recording ("SMR") systems.

SUMMARY

In one embodiment, a data storage medium may include multiple bands of tracks, each band including data tracks arranged in a shingled manner where at least one track partially overwrites an adjacent track and a controller. The controller can be configured to prevent execution of write requests for writes to the data storage medium when a number of bands having data in a cache exceeds a threshold.

In another embodiment, a method may include preventing execution of commands for a data storage device when a number of shingled bands of a data storage medium having associated data in a cache exceeds a threshold.

In yet another embodiment, an apparatus can include a computer readable data storage medium storing instructions that when executed by a processor, cause the processor to perform a method. The method may include preventing execution of write requests for writes to a data storage medium when a number of shingled bands of the data storage medium having associated data in a cache exceeds a threshold.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

In some embodiments, a data storage device may have one or more discs including tracks for storing data. A disc may be divided into multiple zones and each zone may have different configurations of various parameters, such as data track formats, directions of writing from a transducer, data densities, or intended uses for storing data. For example, a disc may have a zone designated as a media cache intended for sequential storage of data, which may or may not be in a shingled track manner. The disc may also have one or more zones designated for data storage in a shingled track manner; that is, at least one track in the shingled zone intentionally overlaps an adjacent track. In some instances, there may be multiple bands of overlapped tracks in a zone or on a disc. A band can include at least one overlapped track and a last track that is not overlapped by the next track intended to store data; thus, there may be a guard track, or spacer (i.e. spacing track), in-between the last track of a zone and the first track of another zone. The disc may further have at least one zone designated for spare sectors. In an embodiment, a data storage device is configured to limit disc nodes by band usage, reducing timeouts while also maintaining adequate performance levels, even in a system that has a fixed number of tracks per band. In an embodiment, the data storage device can be configured to limit the disc nodes if the number of unique bands is too high.

Figure 1:
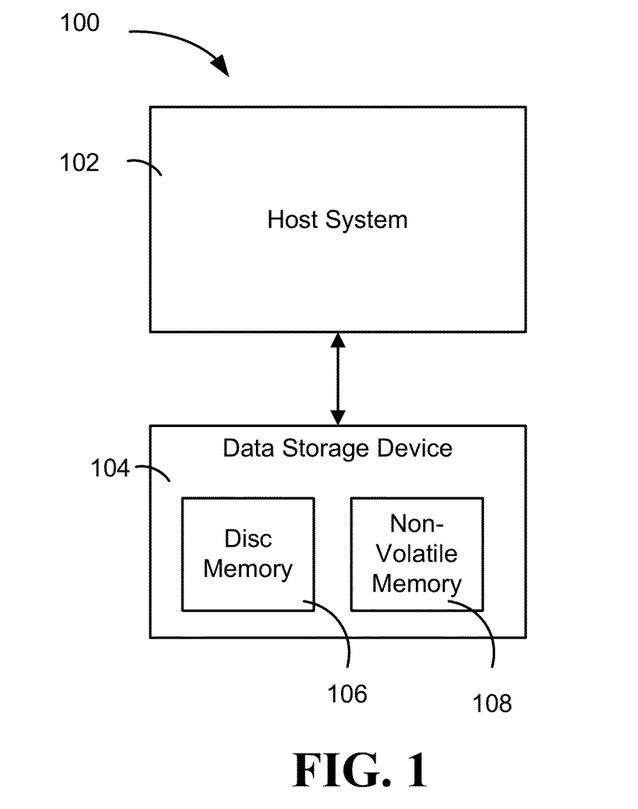
FIG. 1 is a diagram of an illustrative embodiment of a system configured to limit disc nodes by band usage.

FIG. 1 depicts an embodiment of a system for limiting disc nodes by band usage, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories. In the depicted embodiment, the DSD 104 could be a hybrid storage device with both a disc memory 106 and a second non-volatile memory 108, such as a flash memory or other data storage apparatus. In some embodiments, the DSD 104 may contain additional memories or memory types, including volatile memory, such as random access memory (RAM), volatile cache, or other types of volatile memory.

In an embodiment of system 100, the disc memory 106 can have one or more zones configured to store data on shingled data tracks using shingled recording, such as shingled magnetic recording (SMR). SMR is a recording method to increase data recording density on a disc, where a track of data partially overlaps an adjacent data track. SMR will be discussed in more detail with regard to FIG. 2.

Figure 2:
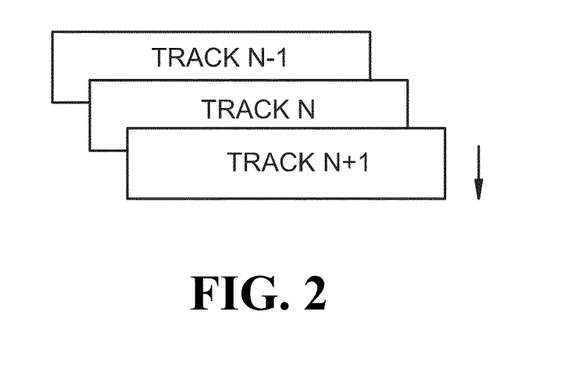
FIG. 2 is a diagram of an illustrative embodiment of a system configured to limit disc nodes by band usage.

SMR is a scheme of executing a write operation in one radial direction across a disc, where a portion of the tracks partially overlap each other similar to roofing shingles. Referring to FIG. 2, if it is assumed that writing is performed in an arrow-indicated direction in the shingle-write scheme, when writing is performed on track N, adjacent track N−1 is partially overwritten. Also, when writing is performed on track N+1, adjacent track N is partially overwritten. In contrast to recording methods where each track is written without any intended overlap, SMR can result in an increase of the tracks per inch (TPI) characteristic as a recording density in a radial direction of a storage medium.

Due to the overlapped nature of shingled tracks, writes should only be performed in one direction for a given set of shingled tracks, as indicated by the arrow in FIG. 2. After writing on track N, if track N−1 is written in a reverse direction of the shingled recording direction, track N may become unreadable due to Adjacent Track Interference (ATI). Track N may be partially overwritten by both track N+1 and track N−1, which may render the data on Track N unreadable. Therefore, it may be advantageous to follow a constraint that track N−1 should not be written after track N is written. For this reason, writing to shingled tracks may require a different writing strategy than with non-shingled tracks.

Figure 3:
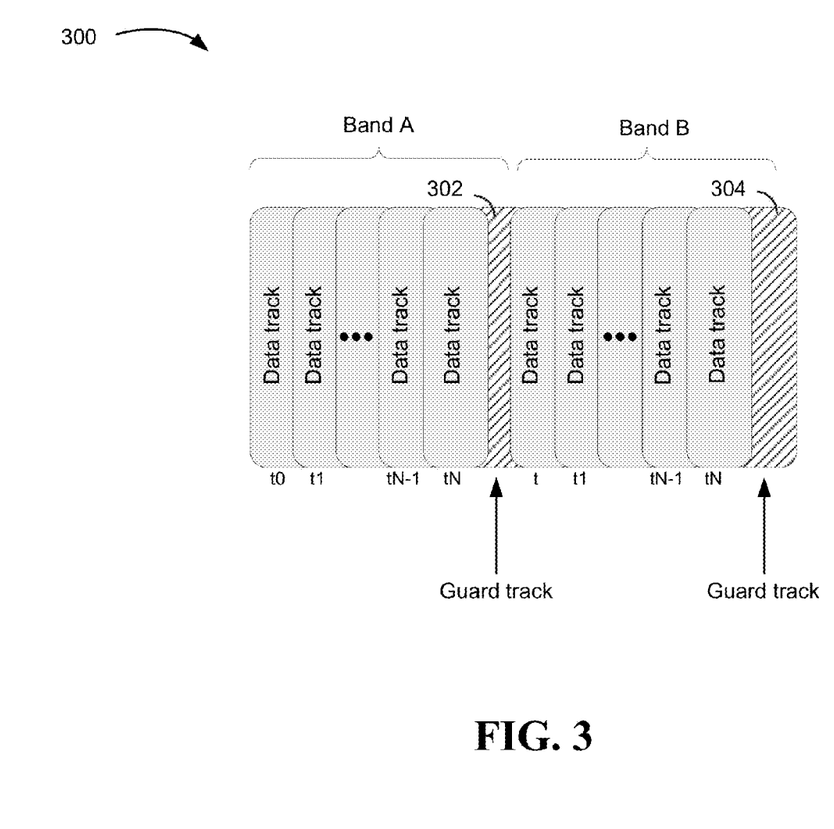
FIG. 3 is a diagram of an illustrative embodiment of a system configured to limit disc nodes by band usage.
Figure 4:
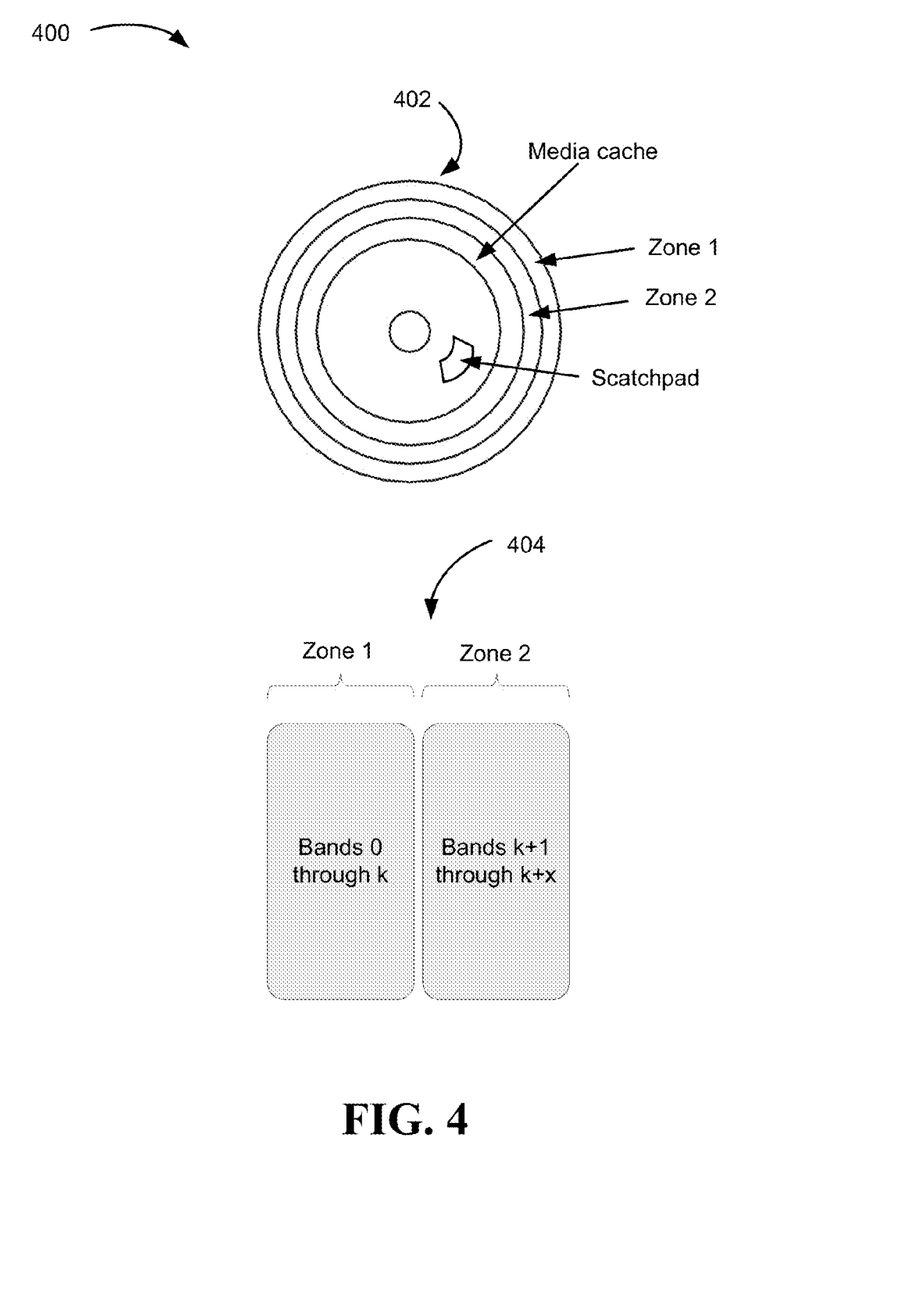
FIG. 4 is a diagram of an illustrative embodiment of a system configured to limit disc nodes by band usage.

Due to the single-write direction of SMR, writing a given track N−1 after track N has been written may require rewriting all shingled tracks that follow track N−1 (i.e. track N, track N+1, track N+2, etc.). In order to accomplish this realistically, a set of tracks may be grouped into a band, with the band ending with a guard track. In some embodiments, the guard track can be a non-shingled track, or a shingled track which is not used to record data. When track N−1 needs to be rewritten, tracks N−1 through the guard track can be rewritten, while tracks in other bands are not affected. Accordingly, the shingled tracks in a zone may be divided into a plurality of bands. In the example shown in FIG. 3, two shingled bands of a shingled disc of a DSD are depicted. Each band can contain N shingled tracks, although a band on a shingled drive may or may not have the same number of tracks as another band. A guard track 302 may be located between the last track of a first band, Band A, and the first track of a second band, Band B. A guard track 304 may optionally be located after Band B even if there are no other bands after it. As depicted in the example embodiment of FIG. 4, a DSD can contain a disc comprised of multiple storage zones, a media cache, and a scratchpad 402. Each zone may contain numerous bands; the disc shown in this example can contain two zones 404, Zone 1 and Zone 2. Zone 1 may contain bands 0 through k and Zone 2 may contain bands k+1 through k+x. As previously discussed, each band may be comprised of a group of shingled tracks ending with a guard track, and each track can be further divided into a plurality of logical block addresses (LBAs), with chunks of data written to each LBA.

A media cache may be a reserved space on a data storage medium that is not statically mapped to user LBAs. The media cache can have a relatively large capacity, as compared to a buffer for data incoming to a data storage device, with attributes such as a high throughput and may be used when a large amount of data associated with one or more write operations have to be stored quickly, such as when audio or video data is streamed from the host. In a particular embodiment, the media cache may be located on a disc or solid state, non-volatile memory location, may be on a shingled or non-shingled medium, and may be found in a reserved section or zone of a DSD. A media cache can allow greater throughput of data from the host to the data storage device than if the data storage device had to write data directly to a shingled track zone in response to every write request from the host. For example, a DSD may store numerous write commands to the media cache, then determine an efficient order of performing the writes to the main data storage area. This can improve write efficiency over performing each write command as it is received by reducing the time spent rotating the disc and adjusting the relative position of the write heads.

A scratchpad can be an area on a disc, a different nonvolatile memory such as Flash memory, or any combination thereof, and can be used in a read-modify-write-write (RMWW) operation for updating shingled data, which is discussed below. There may be multiple scratchpads, each of which can be a different size and may or may not be on the same medium as the others. Generally, a scratchpad and a media cache can each have a self-describing structure, that is the contents of a scratchpad or the contents of a media cache can be described in a header of the scratchpad or the media cache, respectively.

In some embodiments, a data storage device may receive data from a host to be stored to a disc storage medium that has a scratchpad and a shingled track zone used for main storage. In an embodiment, a DSD employing SMR receives a write command to overwrite one or more shingled tracks in a band. The data to be written may come from a host device, a main storage area, or another location. In order to write to a shingled storage it may be necessary to read multiple tracks of a band on the shingled storage, modify the read data, write the modified data into a scratchpad, and then write the modified data back to the band of the shingled media. This can be called a read-modify-write-write operation (RMWW). The extra step of writing to a scratchpad can be used to avoid data loss in the event of an unexpected power loss or other write error. If data was written directly back to the shingled band and a power loss occurred before the write was complete, data on one or more tracks could be lost due to ATI. If a power loss occurs while writing to a scratchpad, the original data is still maintained in the shingled band. If data loss occurs while writing to the shingled band, the modified data is still maintained in the scratchpad. Thus, this extra write operation can protect the data in the event of an error that could affect the write from the buffer to the main storage, such as a power failure.

Figure 5:
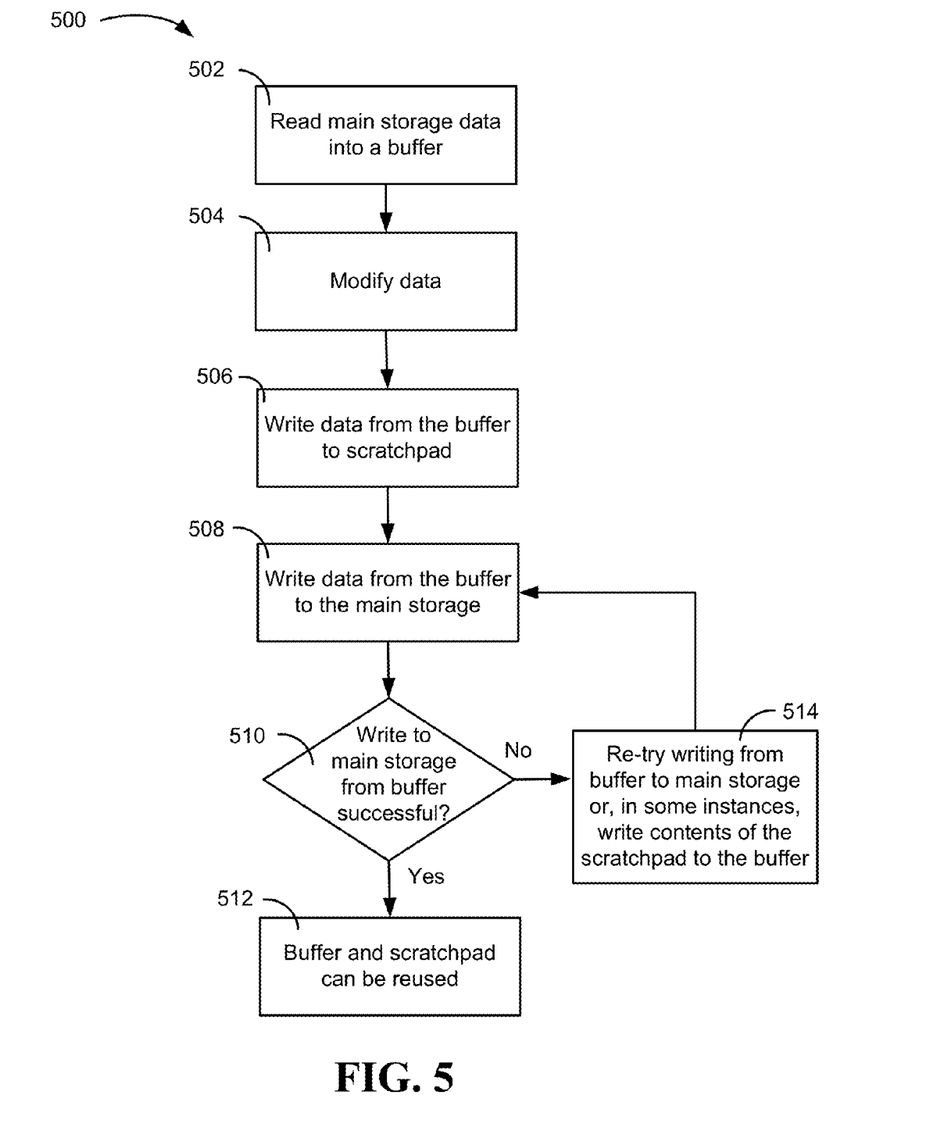
FIG. 5 is a diagram of an illustrative embodiment of a method of read-modify-write-write operations.

FIG. 5 illustrates an embodiment of a method of read-modify-write-write operations, generally designated 500. Generally, to write to a band of shingled tracks, a device could read all of the data from a band, cache, or other storage into a buffer, at 502, and modify the data that is to be updated, at 504. Data may be written to the scratchpad, at 506, where the data can be safely stored until written to the main storage, at 508. The method 500 may also check if the write to the band in the main store from the buffer has completed successfully, at 510. When the data are successfully written from the buffer to the main storage, the scratchpad and buffer are both ready to be reused, at 512.

When the write from the buffer is not completed successfully, which may be the result of an error or a power loss, the data in the scratchpad may be written to the buffer, at 514, where it can then be written to the main storage. If the previous data in the buffer is determined or could possibly be corrupted, such as determined via error correcting codes or a parity check, the system could read the data from the scratchpad to the buffer, and then write to the band in the main store, such as after a DSD has been restarted due to a power loss. However, if the data in the buffer does not have errors, there may be no need to read from the scratchpad and the buffer can be written to the band in the main store. A RMWW process can protect against data loss in shingled recording devices, but the RMWW process may take more time than writing data to non-shingled tracks where data can be written randomly.

To increase the write performance of shingled drives, the DSD can often store a plurality of sets of consecutive LBAs (known as "disc nodes") in a cache, such as a write cache. Such write caching often increases performance because the likelihood of having overlapping or adjacent disc nodes from the host can increase as the number of disc nodes in the write cache or buffer grows. When multiple disc nodes have target LBAs in a single band, the DSD can merge the multiple disc nodes in one RMWW operation rather than performing a RMWW for each disc node. However, there can be host timeout problems if the DSD has too many disc nodes to write when a write cache may need to be flushed.

As write commands are received at a DSD, the write cache may fill up with data to be written to the appropriate LBAs of the main data storage. When the cache becomes full or reaches a certain capacity threshold, the DSD may perform a cache flush operation to move data from the cache to the appropriate LBAs and make room for new data in the cache. A single write to a shingled zone to an SMR device can take a relatively long time to complete; for example, hundreds of milliseconds. Flushing the cache may involve numerous write operations, which may take many seconds based on how many bands must be written. If a host command is not completed within a period of time, e.g. 6 seconds, due to the DSD being busy with a cache flush, the host command may time out.

In non-SMR drives, where a complete write of a disc node may take 10 ms, the length of time required to complete a cache write of, for example, 100 disc nodes could be one second. By contrast, a node write on an SMR drive can take much longer. For example, a RMWW in an SMR drive can take 200 ms per band. Assuming the write cache contains data associated with 100 disc nodes, and further supposing that each node is located on a separate band, it could take 200 ms×100, or 20 seconds, to write 100 nodes from the cache. Twenty seconds can timeout a host command and may cause the DSD to appear less responsive to the host.

One way to avoid this issue can be to limit the number of disc nodes stored in the write cache before performing a cache flush. However, it can be beneficial to assume that each disc node may require writing to a different band. Failure to assume this worst-case scenario and setting the disc node limit too high may result in a host command timing out. On the other hand, setting the disc node limit too low may result in flushing the cache before it is necessary or an optimum use of the resources needed to flush the write cache. For example, the write cache may contain multiple disc nodes belonging in a single band, and setting a disc node limit too low may result in the cache being flushed when only a single band is to be rewritten.

Another solution to prevent host command timeouts involves limiting the number of bands to be written in a cache flush operation. For the sake of simplicity, assume that the average time to complete a write from the cache to a band is relatively fixed; each write to a band can require the same amount of time to complete. For example, when it takes 200 ms to write to a single band from the write cache, it may take 1.6 seconds to perform a cache flush involving eight bands. Some bands may contain more or fewer tracks than others and may, for various reasons, have different write times.

In an embodiment, a read-modify-write-write (RMWW) process can take as long as 200 ms to write to a single band of data. As part of the modify (merge) process, multiple host writes intended for a single band can be combined to be written to the band in one operation from the write cache. Thus, the time required for an RMWW process to complete may not depend on the number of disc nodes, but rather on the number of bands which must be rewritten. For example, the time required to write data associated with 15 disc nodes to a band may be 200 ms, and the time required to write data associated with 100 disc nodes to a band may also be 200 ms, thus demonstrating that disc nodes may have a much smaller impact on cache flush completion time than the number of band RMWW operations.

Figure 6:
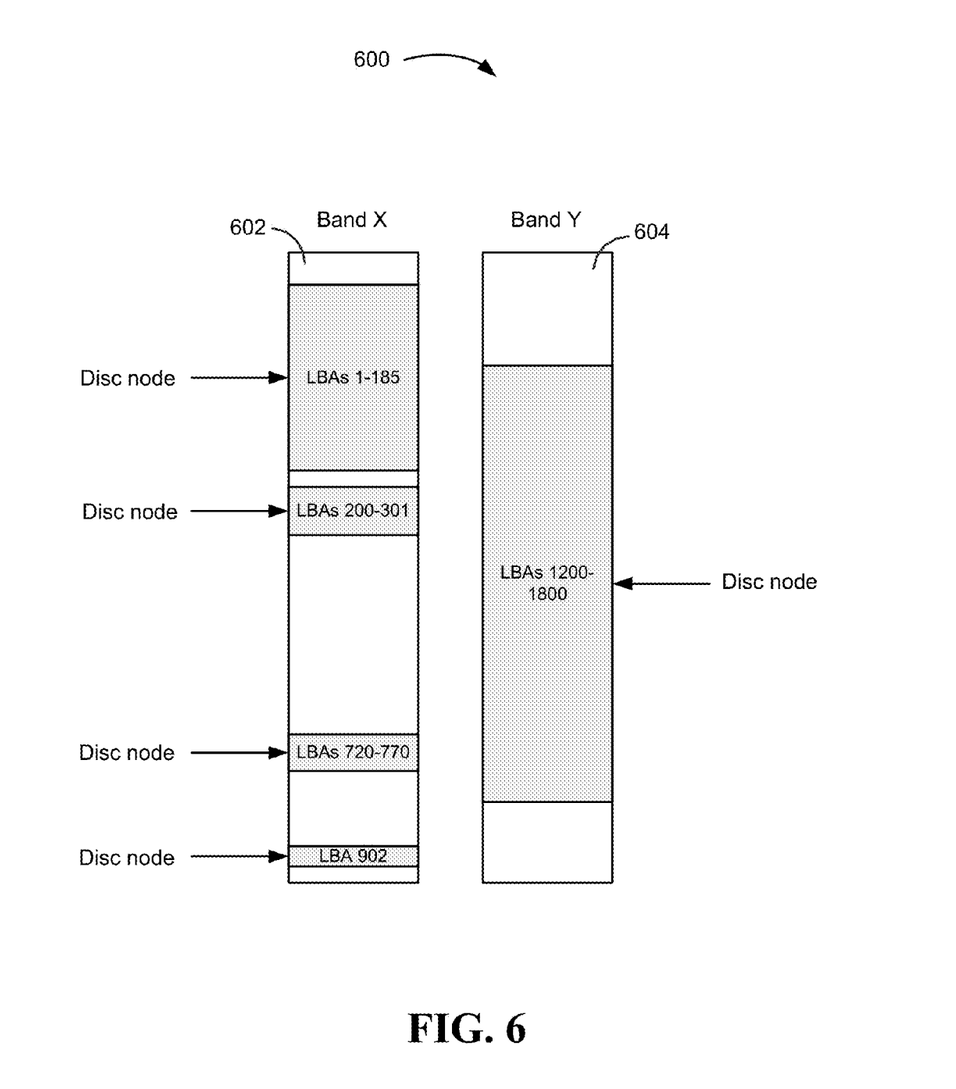
FIG. 6 is a diagram of an illustrative embodiment of a system configured to limit disc nodes by band usage.

A diagram of an illustrative embodiment of a system designed for limiting disc nodes by band usage can be found in FIG. 6, generally designated 600. FIG. 6 illustrates an example relationship between disc nodes and bands. In this example, a first band, Band X, at 602, may contain four disc nodes. Each disc node can be comprised of an LBA range, and each LBA range can contain as little as one LBA or a number of LBAs up to and including all the LBAs in a band. A second band, Band Y, at 604, can contain one disc node which may be comprised of a relatively large number of LBAs. Since the time it takes to write to a band may not be dependent on the number of disc nodes in the band or the number of LBAs in the disc nodes, if the provided Band X and Band Y are about equal in terms of size, access times, write speeds, and other considerations, the write times for Band X and Band Y may both be substantially the same.

Host workloads can have localized write activity, the result of which may be write commands for multiple disc nodes within the same band, which can thus be written in one RMWW operation. In order to prevent the host command from timing out, the number of outstanding unique RMWW operations may need to be restricted to fall within a certain threshold, at which time the DSD may throttle incoming write commands. That is, a controller of the DSD may prevent execution of write requests for writes to the shingled data storage medium when a number of bands having data in a cache exceeds a threshold. This may be done by not accepting write requests from a host, not providing a confirmation of the write to a host, or by notifying the host not to initiate more write requests.

In some embodiments, when the threshold of bands to be written from the write cache is reached, cached data from one or more of the bands contributing to the threshold may be flushed. However, in some embodiments, the decision of when to clean (i.e. flush) the write cache may be completely independent of such threshold. In such embodiments, throttling of the commands may occur until the number of band nodes in the write cache falls below the threshold. The threshold value can vary and may be set by the manufacturer, a host, an operating system, a user, and so forth.

Figure 7:
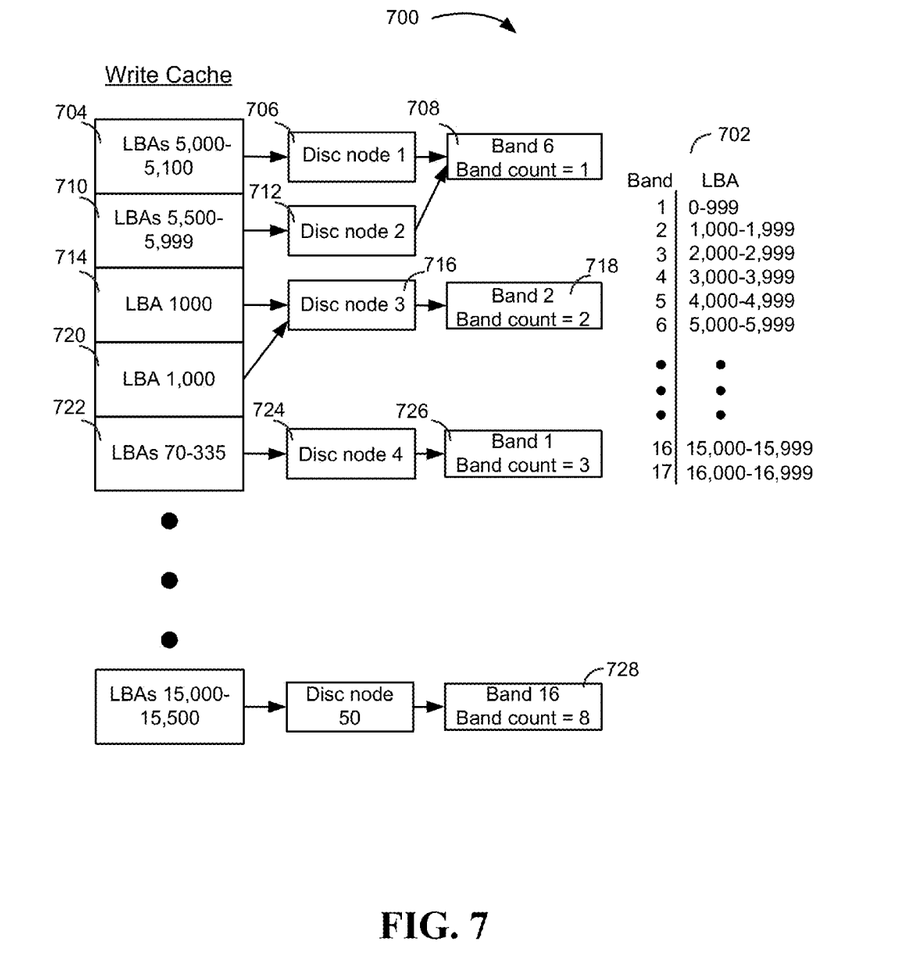
FIG. 7 is a diagram of an illustrative embodiment of a system configured to limit disc nodes by band usage.

Referring to FIG. 7, a diagram of an illustrative embodiment of a system designed for limiting disc nodes by band usage is shown and generally designated 700. FIG. 7 demonstrates how bands can be counted based upon disc nodes in the cache. The DSD may determine whether disc nodes belong to a band on the shingled data storage medium or to another storage medium. When the disc nodes are associated with bands on the shingled storage medium, the DSD may determine how many bands contain data by looking at the distribution of disc nodes. When a disc node falls within the LBAs of a band that is not yet in the cache, the DSD may then assign a node to the band and a band counter can be increased by one. When a disc node falls within the LBAs of a band already in the cache, the data can be held in the cache and the counter may not increase. The process may continue until the number of bands has reached a threshold, a cache cleaning occurs, or the cache becomes full, after which incoming write requests may be throttled or the cache may be flushed.

In the embodiment in FIG. 7, an example listing of band numbers and associated LBA ranges are shown at 702. A host may issue a write command for the data associated with LBAs 5,000 to 5,100 to write to the main storage and thus can be held in the write cache at 704. The LBA range 5,000 to 5,100, or Disc node 1, at 706, can be associated with Band 6 and the DSD may start the band count at one, at 708. A host may also have issued a write command for the data associated with LBAs 5,500-5,999 to write to the main storage, and so they, too, may be held in the write cache at 710. LBA range 5,500 to 5,999, or Disc node 2, at 712, may fall within the LBA range of Band 6. Since both Disc nodes 1 and 2 may fall within Band 6, the band count can remain at one, at 708.

In some embodiments, a host may call for data from the same LBA range to be written more than once. When this happens, only the newer data for the LBA range needs to be written to the main storage. Therefore, only one disc node may be recognized because the LBA range may only be written once regardless of how many times the disc node may be updated. The DSD may determine if the LBA range, or disc node, falls within the LBAs assigned to a band already in the write cache. When it does, the band count may not change, but when the LBA range doesn't fall within a band already in the cache, the band count can increase. For example, referring to FIG. 7, a host may have issued write commands for two identical LBAs to write to the main storage. The data for the LBAs can be stored in the cache, at 714 and 720. Even though there may be a call for two LBA writes, there may be only one disc node 716 because both writes may be for the same location. Disc node 3, at 716, may be associated with a band not already in the write cache. When the band count is less than the threshold, the new band 2 at 718 may be added to the count, and the band count may increase by one.

Further, in the example of FIG. 7, LBAs 70 to 335, which can be stored in the write cache, at 722, and be designated disc node 4, at 724, which may be associated with LBAs from Band 1. The DSD may determine that Band 1 will require a new band to be written (i.e. a RMWW operation for each band in the count) which could result in the band count increasing by one, at 726. In the example shown, the band count may now be at three. Further, in some embodiments, a disc node could encompass more than one band, and in some instances, cause more than one band to be added to the band count.

In the embodiment shown in FIG. 7, the threshold for the maximum number of bands to be stored in the cache before a flush may be eight, at 728. When the host attempts to store data to the write cache that would require a RMWW operation to a ninth band, the incoming write operations to the DSD may be throttled, delayed, or denied execution. Before throttling can be reversed, data in the write cache corresponding to at least one of the bands in the band count may need to be flushed. New writes may have to wait for at least one RMWW operation to complete before they can be stored in the write cache.

Thus, the band count threshold can be an indirect throttling method of what is stored to the write cache or other operations. For example, in some cases write caching could be enable and the DSD may refuse to take in more data from the host; this could also be done if write caching is disabled. Though, in another example, with command queuing, a DSD could queue a command and send an acknowledgement that the command is received to the host. The DSD could also put the command and associated data in a host queue; but could delay start of data transfer for the command until the band count is less than the threshold. Thus, in some embodiments, write operations may not have a host transfer performed until one of the bands in the band count is cleaned out of the write cache. However, the band count threshold can be completely independent of the determination of when to do a RMWW operation to clean a band from the write cache. This can be beneficial when the DSD has no other place to put incoming writes once the band threshold has been reached.

A determination of when data is flushed from the cache can depend on which discs nodes are associated with the band or other factors, such as discussed herein. For example, if a host is waiting on a command to complete, then the DSD could choose the band associated with the pending host command to clean next. If the pending host command is a write command, it can be merged into the merge of the RMWW. Further, algorithms can determine which band to clean next based on timing of host commands, timing of pending disc nodes, amount of data associated with the band in the write cache, length of time since last cleaning of the respective band, other reasons, or any combination thereof.

A DSD can determine whether data in the write cache belongs on a main storage shingled or non-shingled storage medium, or to other types of memory including volatile and non-volatile solid state memory. When the DSD determines that a host write command is for data located on a shingled data medium, it can assign the data to a band based upon its associated LBA range, or disc node. For example, a first band, band one, may have an LBA range of 0 to 999, and a second band, band two, may have an LBA range of 1,000 to 1,999. A disc node may belong to band one if its LBA range is between 0 and 999, or band two, if its LBA range is between 1,000 and 1,999. A disc node may belong to any band on the disc.

When a disc node is assigned to a band not already slated to receive data during a cache flush, the band may be added to a list of bands to write from the cache when it is eventually flushed. Each time data to be written to a new band is added to the write cache, a band counter can increase. The process of adding nodes to the bands, and adding a list of bands for writing from the write cache may continue until the band counter reaches a threshold. When the threshold is reached, write requests from a host may be throttled. After at least one band has been cleaned to reduce a number of bands needing cleaning indicated by the band counter (i.e. the band counter is reduced by at least one) the assignments of disc nodes associated with the flushed cache data can be released or cleared.

The embodiment in FIG. 7 is just an example. The host may issue write commands to bands in the cache in a different order and the band count threshold may be a number other than eight. Further, a DSD may contain a plurality of bands including, but not limited, to 17.

Figure 8:
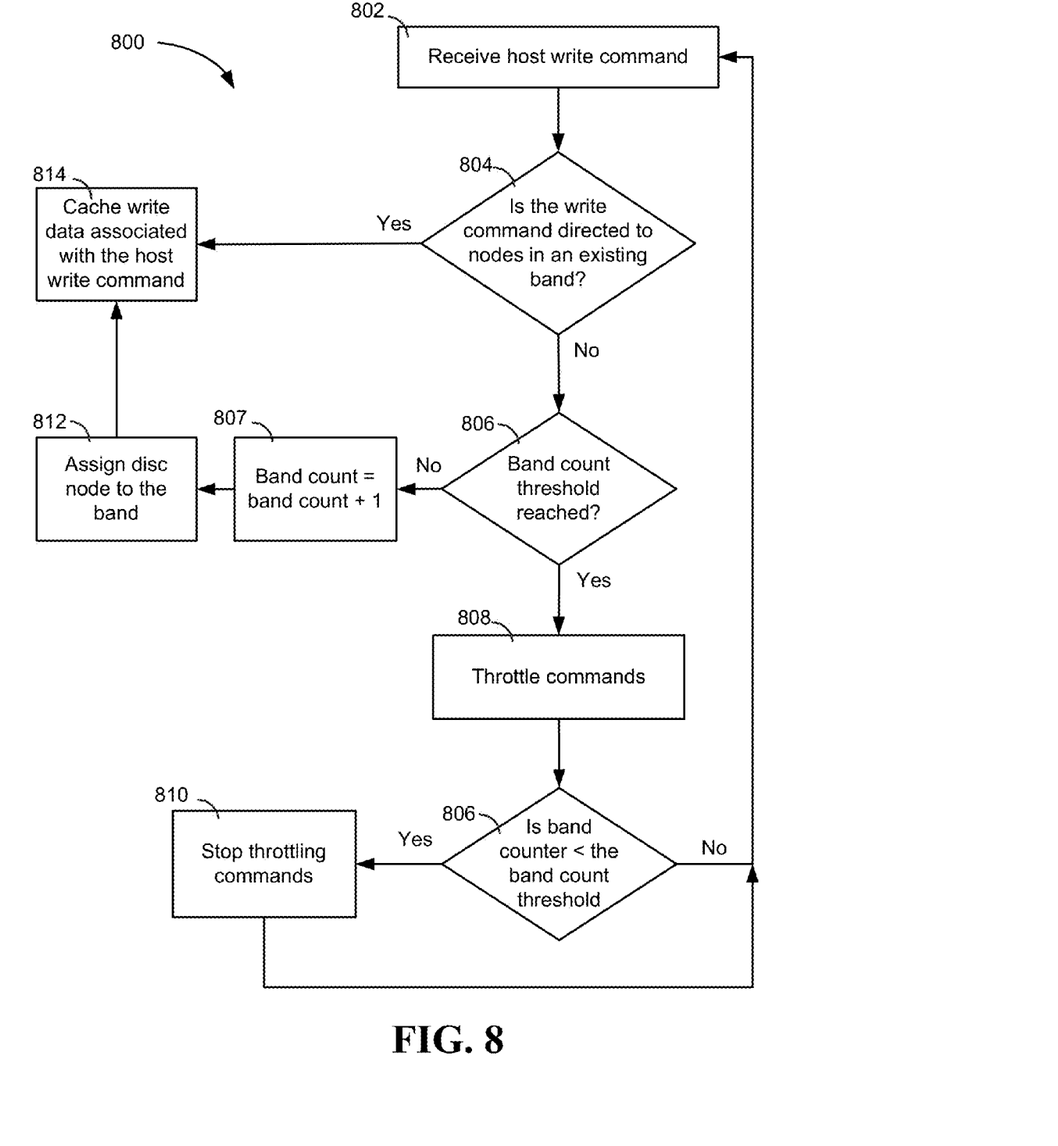
FIG. 8 is a flowchart of an illustrative embodiment of a method of limiting disc nodes by band usage.

Referring to FIG. 8, a flowchart of an illustrative embodiment of a method of limiting disc nodes by band usage is shown and generally designated 800. A DSD may receive a write command from the host, at 802. The DSD determines whether the write command is directed to nodes associated with bands already in the cache, at 804. If the write command is directed to an existing band, the data associated with the write command can be cached at 814, and the band count may not be incremented.

When the nodes are not associated with bands already in the cache, at 804, the DSD can determine if the band count threshold has been reached, at 806, and if so, may throttle incoming commands, at 808. When the threshold has not been reached and another band may have to be added to the list of bands awaiting a cache flush, the band count may be incremented by at least one, at 807. The node may be assigned to its respective band, at 812. For example, the node may be added to an association table or header information for the cache, listing the disc nodes in the cache, and which bands must be written to clean the disc nodes. The data associated with the write command for the disc node can then be cached, at 814.

When a number of bands needing to be cleaned from the cache is below the threshold, at 806, throttling of commands can be stopped, at 810. This may occur after the cache has been flushed of at least one band. When the band counter is still at or above the threshold, the process may still throttle commands until a band node (or band count) is available. When a cache cleaning is performed may be determined completely independently of throttling the commands.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, microprocessors, and other hardware devices can likewise be constructed to implement the methods described herein. Further, the methods described herein may be implemented as a computer readable storage medium or device including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a data storage medium including multiple bands of tracks, each band including data tracks arranged in a shingled manner where at least one track partially overlaps an adjacent track;
a controller configured to:
prevent execution of write requests for writes to the data storage medium when a number of bands having data in a cache exceeds a threshold.

2. The apparatus of claim 1, comprising:
the controller further configured to:
determine a number of bands that must be written to distribute data stored in the cache;
compare the number of bands to the threshold; and
when the number of bands exceeds the threshold, prevent execution of a command until the number of bands is below the threshold.

3. The apparatus of claim 2, comprising:
the controller further configured to:
when the number of bands does not exceed the threshold, allow execution of the command.

4. The apparatus of claim 2, comprising:
the controller further configured to:
determine whether a write command received by the apparatus is to write data to a band currently having data in the cache;
when the band does not currently have data in the cache and the number of bands does not exceed the threshold, allow the data associated with the write command to be stored to the cache and increment the number of bands to be compared to the threshold.

5. The apparatus of claim 4, comprising:
the controller further configured to:
when the band does currently have data in the cache, allow the data associated with the write command to be stored to the cache and not increment the number of bands to be compared to the threshold.

6. The apparatus of claim 5, comprising:
the controller further configured to:
when the band does not currently have data in the cache and the number of bands is at the threshold, do not allow the data associated with the write command to be stored to the cache until the number of bands does not exceed the threshold.

7. The apparatus of claim 6, comprising:
the controller further configured to:
clean selected data associated with a selected band from the cache by reading the selected band, reading the selected data, merging the selected data with the selected band to obtain modified data, and writing the modified data to the selected band.

8. The apparatus of claim 7, comprising:
the controller further configured to:
write the modified data to a second band before writing the modified data to the selected band.

9. The apparatus of claim 8, comprising:
the data storage medium includes a disc data storage medium;
the controller further configured to:
associate a disc node with each write having a unique logical block address received by the apparatus;
determine a count of a number of unique bands that are associated with pending disc nodes in the cache;
compare the number of unique bands to the threshold; and
store new data associated with a new write to the cache when the number of unique bands is less than the threshold.

10. The apparatus of claim 9, comprising:
the controller further configured to:
store the new data to the cache when the number of unique bands exceeds the threshold but the new data is associated with a disc node of a band already counted in the number of unique bands.

11. A method comprising:
preventing execution of commands for a data storage device when a number of shingled bands of a data storage medium having associated data in a cache exceeds a threshold.

12. The method of claim 11, further comprising:
determining a number of bands that must be written to distribute data stored in a cache;
comparing the number of bands to the threshold;
preventing completion of a command when the number of bands exceeds the threshold; and
allowing completion of a command when the number of bands is below the threshold.

13. The method of claim 11, further comprising:
copying selected data associated with a selected band from the cache by reading the selected band into a buffer, merging the selected data with the selected band to obtain modified data, and writing the modified data to the selected band.

14. The method of claim 11, further comprising:
associating a disc node with each write operation having a unique logical block address;
determining a count of a number of unique bands that are associated with pending disc nodes in the cache;
comparing the number of unique bands to the threshold; and
allowing execution of new commands when the number of unique bands is less than the threshold.

15. The method of claim 14, further comprising:
allowing execution of a new command when the number of unique bands exceeds the threshold and data associated with the new command is associated with a disc node of a band already counted in the number of unique bands.

16. An apparatus comprising:
a memory device storing instructions that when executed by a processor, cause the processor to perform a method including:
preventing execution of write requests for writes to a data storage medium when a number of shingled bands of the data storage medium having associated data in a cache exceeds a threshold.

17. The apparatus of claim 16, comprising:
the memory device storing instructions that when executed by a processor, cause the processor to perform the method further including:
determining a number of bands that must be written to distribute data stored in a cache;
comparing the number of bands to the threshold;
preventing completion of a command when the number of bands exceeds the threshold; and
allowing completion of a command when the number of bands is below the threshold.

18. The apparatus of claim 16, comprising:
the memory device storing instructions that when executed by a processor, cause the processor to perform the method further including:
copying selected data associated with a selected band from the cache by reading the selected band into a buffer, merging the selected data with the selected band to obtain modified data, and writing the modified data to the selected band.

19. The apparatus of claim 16, comprising:
the memory device storing instructions that when executed by a processor, cause the processor to perform the method further including:
associating a disc node with each write operation having a unique logical block address;
determining a count of a number of unique bands that are associated with pending disc nodes in the cache;
comparing the number of unique bands to the threshold; and
allowing execution of new commands when the number of unique bands is less than the threshold.

20. The apparatus of claim 19, comprising:
the memory device storing instructions that when executed by a processor, cause the processor to perform the method further including:
allowing execution of a new command when the number of unique bands exceeds the threshold and data associated with the new command is associated with a disc node of a band already counted in the number of unique bands.

* * * * *